United States Patent
Cavalloni et al.

(10) Patent No.: US 7,546,774 B2
(45) Date of Patent: Jun. 16, 2009

(54) PRESSURE SENSOR WITH ACTIVE AND PASSIVE ACCELERATION COMPENSATION

(75) Inventors: Claudio Cavalloni, Regensdorf (CH);
Dieter Karst, Stein Am Rhein (CH);
Peter Wolfer, Kleinandelfingen (CH);
Stefan Brechbühl, Weinfelden (CH)

(73) Assignee: Kistler Holding, AG, Winterthur (CH)

( * ) Notice: Subject to any disclaimer, the term of this patent is extended or adjusted under 35 U.S.C. 154(b) by 0 days.

(21) Appl. No.: 11/914,972

(22) PCT Filed: Jun. 7, 2006

(86) PCT No.: PCT/CH2006/000304

§ 371 (c)(1),
(2), (4) Date: Nov. 20, 2007

(87) PCT Pub. No.: WO2006/131015

PCT Pub. Date: Dec. 14, 2006

(65) Prior Publication Data
US 2008/0168843 A1    Jul. 17, 2008

(30) Foreign Application Priority Data
Jun. 10, 2005   (CH) ................................. 1011/05

(51) Int. Cl.
*G01L 7/00* (2006.01)
(52) U.S. Cl. .......................................................... 73/756
(58) Field of Classification Search ................... 73/702, 73/723, 753, 756; 310/338
See application file for complete search history.

(56) References Cited

U.S. PATENT DOCUMENTS 2,164,638 A    7/1939   Broeze et al.
3,349,259 A    10/1967  Kistler
3,402,306 A    9/1968   Cary et al.
3,566,163 A    2/1971   Fischer et al.

(Continued)

FOREIGN PATENT DOCUMENTS

GB    1194071    6/1970

OTHER PUBLICATIONS

PCT/CH2006/000271—International Preliminary Report on Patentability, Publication Date: Dec. 14, 2006.

(Continued)

*Primary Examiner*—Lisa M Caputo
*Assistant Examiner*—Freddie Kirkland, III
(74) *Attorney, Agent, or Firm*—Dority & Manning, P.A.

(57) ABSTRACT

An acceleration-compensated pressure pick-up, for example for the measurement of dynamic processes in gaseous or liquid media, comprises an external housing and a pre-assembled inner part having a flange at its assembly end. The inner part is securely fixed to the housing only at the flange. A first mass is connected via a first resilient connection to the flange, and a second mass is connected to the flange via a second resilient connection. A first measurement crystal is inserted under pre-tension between the two masses. A third mass and a compensation crystal are arranged between the first measurement crystal and the second mass, and the compensation crystal is electrically connected in opposition to the first measurement crystal. The two rigidities of the resilient connections and the three masses are matched so that the measurement values which can be determined at the crystals due to an axial acceleration acting on the housing compensate each other.

9 Claims, 2 Drawing Sheets

U.S. PATENT DOCUMENTS

Figure 1:
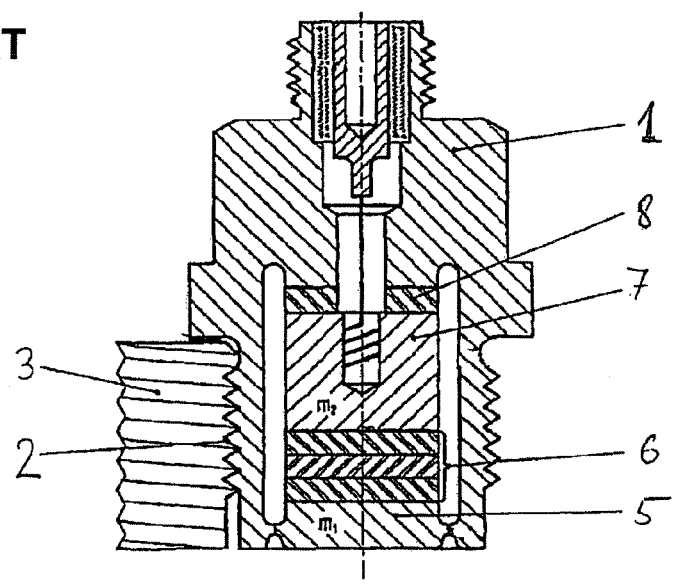

| | | |
|---|---|---|
| 3,651,353 A | 3/1972 | Hugli et al. |
| 3,857,287 A | 12/1974 | Sonderegger et al. |
| 4,016,437 A | 4/1977 | Calderara et al. |
| 4,326,143 A * | 4/1982 | Guth et al. ............. 310/329 |
| 6,105,434 A | 8/2000 | Engeler |
| 6,513,387 B1 * | 2/2003 | Schmid ............. 73/756 |
| 6,655,211 B1 * | 12/2003 | Schmid et al. ............. 73/514.34 |
| 6,777,856 B2 * | 8/2004 | Brechbuhl et al. ............. 310/328 |
| 2008/0116766 A1 * | 5/2008 | Friedl ............. 310/338 |

OTHER PUBLICATIONS

G. Gautschi, "Piezoelectric Sensors", Chapter 8.6.

* cited by examiner

PRESSURE SENSOR WITH ACTIVE AND PASSIVE ACCELERATION COMPENSATION

TECHNICAL FIELD

The invention relates to an acceleration-compensated pressure sensor.

PRIOR ART

For the measurement of dynamic pressure processes in gaseous or liquid media, particularly at engines and turbo systems, there is a demand for pressure pick-ups which can be mounted directly into the vibrating casing wall of these machines while the acceleration forces thereof do not interfere with the pressure signal to be measured. Generally, piezoelectric pressure pick-ups are used for such measurements, in particular in the case of highly dynamic processes or measurements performed in temperature ranges higher than 200° C.

Two types of pressure sensors are available for such applications. The more simple active principle comprises measurement crystals disposed behind a membrane having a first mass as well as a compensation crystal set in the form of a piezo plate electrically connected in opposition and spaced apart from the measurement crystals by a second mass. The two masses are dimensioned to achieve an optimal acceleration compensation. This arrangement has the disadvantage that the mounting of this type of sensor on the lateral thread provided for this purpose causes tensioning of the measurement crystals whereupon the measurement signal is adulterated. Furthermore, an additional tension can occur by deformation at the structural level, for example at the cylinder head. This method has been for example described by G. Gautschi in "Piezoelectric Sensors", Springer Publishing House, 2002, in chapter 8.6, particularly in FIG. 8.12.

EP 0902267 illustrates another passive principle. This document describes a pressure sensor having only one set of crystals wherein the two masses in front of and behind the crystal set are joined to form a compact element freely swinging in the housing by connecting each with a spring element at a common flange itself mounted to the housing at the assembly end. In this case, the spring rigidities and the masses are matched so that when an axial acceleration acts on the housing no resulting force will act on the measuring element. These pressure sensors exhibit very good functionality as long as the diameter of the swinging inner part is in the same order as the height of the measurement crystal. However, if the allowed dimensions for the outer diameters of the sensors are very small the inner portion will be inevitably long like a tower, on the one hand due to the size of the measurement crystal, on the other hand because a large rear mass is required. In consequence, the pressure sensor will be very sensitive to lateral acceleration which will lead to incorrect measurements.

It should be pointed out that these two principles work in very different ways. In the first construction known the force distribution goes through the crystals. In the second construction, however, upon application of a force no signal will be recorded at the measurement crystal since it is not situated in the direction of force distribution. Furthermore, the second construction typically uses rod crystals with transversal effect while the first construction employs plate crystals with longitudinal effect. The advantage of the rod crystals with transversal effect is their much higher sensitivity.

FIG. 1 shows a schematic representation of a piezoelectric pressure pick-up according to the prior art in cross section. This pressure pick-up comprises a housing 1 having a thread 2 for mounting a component 3. The interior space 4 of the housing 1 is sealed by a pressurizable sealing membrane 5 having a first mass. In the interior space 4 of the housing 1, behind said membrane 5, is installed a measurement crystal set 6, followed by a second mass 7, followed by a compensation crystal set 8 which itself on its back side bears on the housing 1. The crystals 6, 8 are prestressed via the housing 1 and the membrane 5. Instead of crystals other piezoelectric material can also be used, in particular a ceramic showing an equivalent effect. Particularly, the two masses 5, 7 are designed to obtain a difference of zero between the charges measured at the measurement crystal set 6 and at the compensation crystal 8 which exclusively derive from an axial acceleration. In this way the effective pressure signal is reduced by about one third of the maximum value which is a great disadvantage because in many cases amplitudes of a few millibars must be measured. In addition, it has been found that by connecting additional masses to the pressure pick-up housing 1, such as plug or metal cable terminals, the acceleration compensation can vary greatly.

Figure 2:
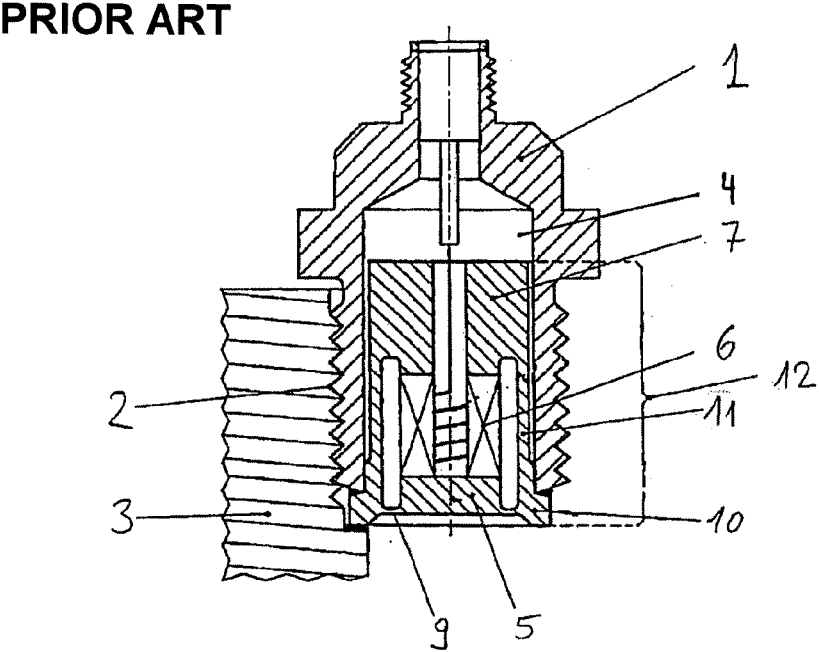

FIG. 2 shows a schematic representation of another piezoelectric pressure pick-up according to the prior art in cross section. This arrangement also comprises a housing 1 with an interior space 4 connected by a membrane 5 having a first mass via a first axially resilient connection 9 to a flange 10. Behind the membrane 5 is arranged a measurement crystal 6 and behind that a second mass 7. This second mass 7 is attached to the flange 10 via a second axially resilient connection 11. These components connected via the flange 10 comprising the two masses 5, 7, the two resilient connections 9, 10 as well as the measurement crystal 6 form an inner part 12 which can swing freely axially within the housing 1 and contacts the housing 1 only via the attachment at the flange 10. This decoupling of the inner part 12 from the housing 1 also abolishes a possible interfering effect of the assembly on a component 3. In this construction the two rigidities of the resilient connections 9, 11 as well as the two masses 5, 7 must be matched so that an axial acceleration acting on the pressure sensor does not induce a signal at the measurement crystal 6 because the displacement of the two interfaces of the measurement crystal 6 adjacent to the two masses 5, 7 is in each case identical.

Since in contrast to FIG. 1 in this arrangement the inner part 12 may not be supported on the housing 1 with its back side the interfering effect of lateral acceleration acting on the inner part 12 is very high. Furthermore, the inner part 12 will be long as a tower if the assembly opening for the pressure sensor has a small diameter and a high sensitivity is demanded at the same time. Therefore, the interference due to lateral acceleration will be even higher.

OBJECTS AND SUMMARY OF THE INVENTION

It is the object of the present invention to suggest a pressure sensor of the type mentioned in the beginning which is insensitive to tension during assembly and provides good measurement values even if its dimensions are small.

This object has been achieved by the features of the independent claim.

The idea underlying the invention is that the pressure sensor according to the invention in addition to a passive acceleration compensation by the selection of rigidities and masses which only compensate a part of the acceleration comprises a second measurement crystal which compensates for the remaining part of the acceleration whereupon the assembly size and thus the sensitivity to lateral acceleration is significantly reduced.

SHORT DESCRIPTION OF THE DRAWINGS

Figure 3:
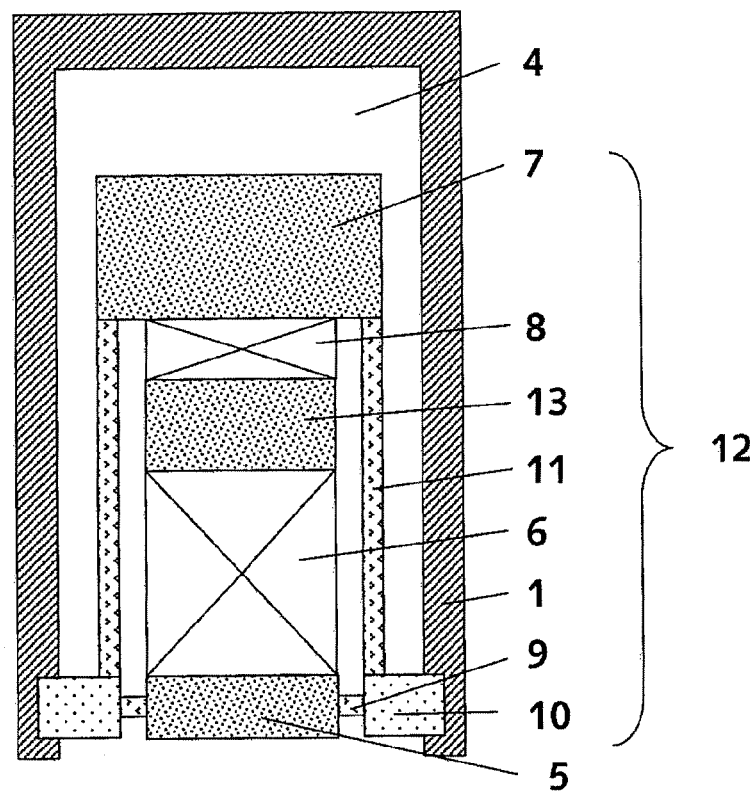
Figure 4:
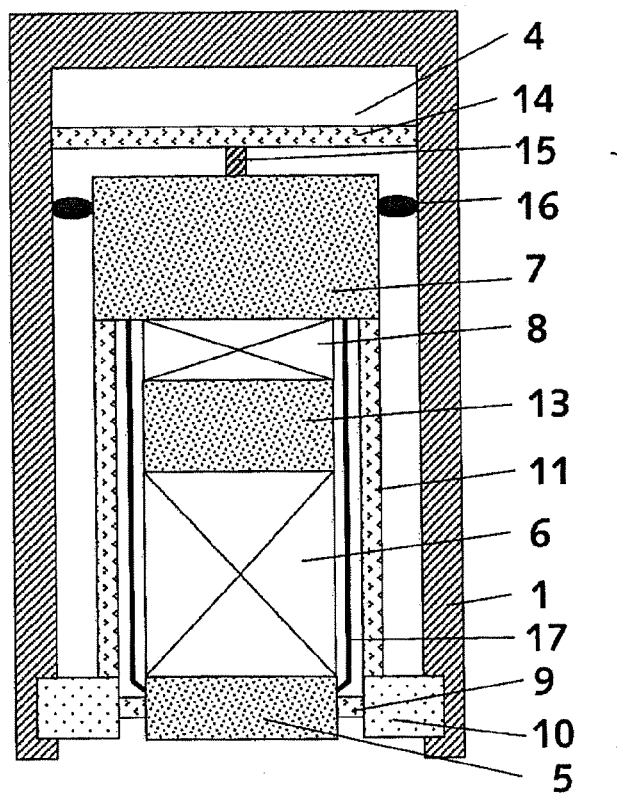

In the following, the invention will be explained in more detail with reference to the drawings which show FIG. 1 a schematic representation of a piezoelectric pressure pick-up in cross section having two crystal sets connected in series according to the prior art;

FIG. 2 a schematic representation of another piezoelectric pressure pick-up in cross section with matched rigidities and masses for acceleration compensation according to the prior art;

FIG. 3 a schematic representation of a piezoelectric pressure pick-up according to the invention;

FIG. 4 a schematic representation of an alternative embodiment of a piezoelectric pressure pick-up according to the invention.

WAYS OF EMBODYING THE INVENTION

FIG. 3 shows a schematic representation of a piezoelectric pressure pick-up according to the invention. This pressure sensor also comprises a housing 1 having an interior space 4 as well as an inner part 12 which is attached to the housing 1 only at a flange 10. Otherwise the inner part 12 can swing freely in an axial direction. To the flange 10 is attached at a first resilient connection 9 a membrane 5 sealing the inner part 4 and having a first mass. At a second resilient connection 11 also attached to the flange 10 is connected a second mass 7. Between these masses 5, 7 are installed a first measurement crystal 6 as well as a second compensation crystal 8 which are themselves spaced apart from each other by a third mass 13.

The idea according to the invention underlying this arrangement is to compensate a part of the acceleration actively by means of a compensation crystal in a calculative manner but to achieve the fine adjustment passively by adjusting spring forces and masses. In this way, the sensor according to the invention will be significantly smaller in size as if only a passive compensation would be applied. The difficulty is, however, to distribute the acceleration compensation on two mechanisms so that none of the disadvantages of the individual arrangements will be prevalent. To achieve this, however, one will not let the second mass 7 rest on the housing 1 via a second measurement crystal 6 as shown in FIG. 1. In the arrangement according to the invention a third mass 13 is employed. This third mass 13 is arranged together with the compensation crystal 8 between the measurement crystal 6 and the second mass 7. The rear bearing of the compensation crystal 8 missing in this arrangement is achieved by a second resilient connection 11 which via the second mass 7 allows for rear support of the compensation crystal 8.

For calibration of the pressure sensor, namely for ensuring a good axial acceleration compensation, various influences must be taken into consideration. The aim is to always have the two crystals 6, 8 report the same values in case of an axial acceleration. In this way the difference between the two signals occurring during a measurement and caused by an axial acceleration will become zero. On the other hand, the measurement value achieved at the measurement crystal 6 induced by a pressure on the membrane 5 shall be as high as possible in contrast to the measurement value induced at the compensation crystal 8 so that the losses in measurement dynamics and sensitivity are as low as possible.

Different from FIG. 2, in this functional principle the measurement crystal 6 will give a signal different from zero in the case of an axial acceleration since the compensation by the rear mass, in this case formed by the second mass 7, the third mass 13 as well as the compensation crystal 8 compensates only part of the acceleration. The measurement crystal 6 will be compressed and elongated by an axial acceleration, although by a small amount.

Secondly, the different masses 5, 7, 13, and the rigidities of the connections 9, 11 must be matched so that the two signals of the crystals 6, 8 are always identical when an axial acceleration occurs. This calibration is performed at the inner part 12 prior to its insertion into the housing 1.

Furthermore, a crossbeam 14 can be mounted at the inner part 12 which is very rigid radially but at the same time very soft axially. In this manner shearing forces may be absorbed which act on the inner part 12.

FIG. 4 represents various alternative variations of such crossbeams 14. Of course, in each case only one variation will be incorporated. On the one hand, the crossbeam 14 may be attached in the form of a membrane fixed to the second mass 7. As represented, it may be fastened to the second mass 7 with a spacing by means of a fixation 15. At the inner wall of the housing the crossbeam 14 may be attached in a firmly secured or a gliding manner.

On the other hand, it may be secured laterally of the second mass 7 between this mass and the inner wall of the housing. Instead of a membrane also an O ring 16 may serve this same function of lateral support.

Another improvement may be achieved by applying an additional tension sleeve 17 between the first mass 5 and the second mass 7 as demonstrated in FIG. 4. This tension sleeve 17 achieves a pre-tension of the crystals 6, 8 and thus relieves the first resilient connection 9 which otherwise would have to bear the pre-tensioning load.

The crystals 6, 8 may be formed from different piezoelectric materials and/or exhibit different crystallographic orientations. In this way further optimization can be performed to miniaturize the pressure sensor. Advantageously, the first measurement crystal 6 shows a transversal effect whereby the sensitivity can be enhanced.

LIST OF REFERENCE NUMERALS

1 housing
2 thread
3 component
4 interior space
5 membrane, first mass
6 measurement crystal set or measurement crystal
7 second mass
8 compensation crystal set or compensation crystal
9 first resilient connection
10 flange
11 second resilient connection
12 inner part
13 third mass
14 crossbeam
15 fixation
16 O ring
17 tension sleeve

The invention claimed is:

1. An acceleration-compensated pressure pick-up, for example for the measurement of dynamic processes in gaseous or liquid media, comprising:

an external housing as well as a pre-assembled inner part having a flange at its assembly end wherein the inner part is securely fixed to the housing only at the flange, a first resilient connection, a first mass connected via said first resilient connection to said flange, a second resilient connection, a second mass connected via said second resilient connection to said flange, a first measurement crystal inserted under pre-tension between said masses, a third mass and a compensation crystal arranged between said first measurement crystal and said second mass, wherein the compensation crystal is electrically connected in opposition to the first measurement crystal, and the two rigidities of the resilient connections as well as the three masses are matched so that the measurement values which can be determined at the crystals due to an axial acceleration acting on the housing compensate each other.

2. A pressure pick-up according to claim 1, wherein the inner part is stabilized with respect to the housing at the end opposite to the flange transversally to the axis by means of a crossbeam.

3. A pressure pick-up according to claim 2, wherein the crossbeam is made of a membrane which is axially soft and radially rigid.

4. A pressure pick-up according to claim 2, wherein the crossbeam consists of an O ring arranged between the second mass and the housing.

5. A pressure pick-up according to claim 2, wherein the crossbeam is fixed to the housing in an axially sliding manner.

6. A pressure pick-up according to claim 1, wherein the crystals and the third mass are pre-tensioned by means of a tension sleeve arranged between the first and the second mass.

7. A pressure pick-up according to claim 1, wherein the crystals are made of different piezoelectric materials.

8. A pressure pick-up according to claim 1, wherein the crystals show different crystallographic orientations.

9. A pressure pick-up according to claim 1, wherein the first measurement crystal shows a transversal effect.

* * * * *